No. 723,786. PATENTED MAR. 24, 1903.
A. W. SCHRAMM.
ALTERNATING CURRENT MOTOR.
APPLICATION FILED JULY 26, 1902.
NO MODEL.
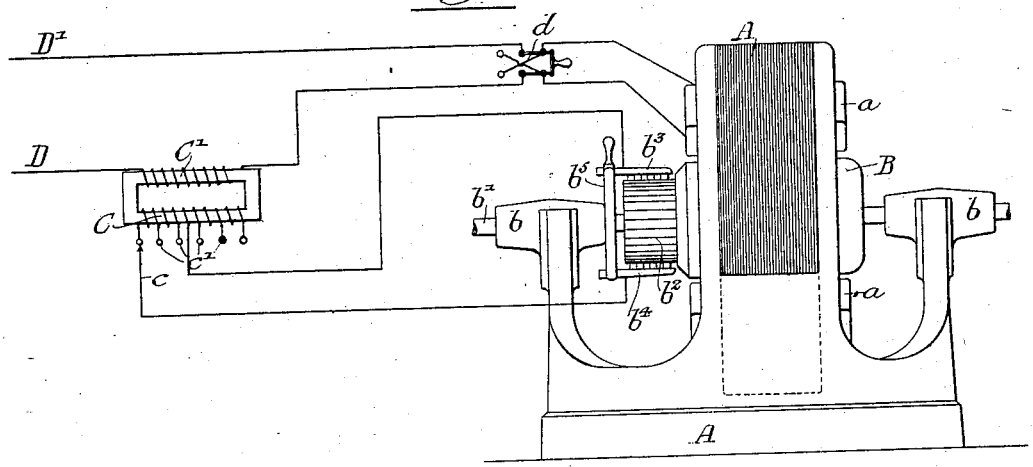
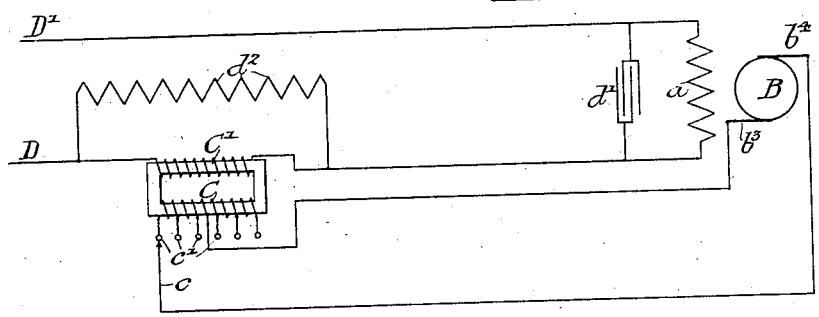

UNITED STATES PATENT OFFICE.

ADOLPH W. SCHRAMM, OF PHILADELPHIA, PENNSYLVANIA, ASSIGNOR OF ONE-HALF TO EDWARD B. WILFORD, OF PHILADELPHIA, PENNSYLVANIA.

ALTERNATING-CURRENT MOTOR.

SPECIFICATION forming part of Letters Patent No. 723,786, dated March 24, 1903.

Application filed July 26, 1902. Serial No. 117,121. (No model.)

*To all whom it may concern:*

Be it known that I, ADOLPH W. SCHRAMM, a citizen of the United States, residing in Philadelphia, Pennsylvania, have invented certain Improvements in Alternating-Current Motors, of which the following is a specification.

My invention consists in certain improvements in alternating-current motors of the single-phase type, the object of the invention being to provide a motor of such a design that in addition to having a relatively large starting torque it shall be efficient in operation and easily reversible.

A further object of the invention is to provide a motor which shall have a high-power factor and which shall maintain a practically constant speed under normal load variations at each position of the controller.

These objects I attain as hereinafter set forth, reference being had to the accompanying drawings, in which—

Figure 1 is a view, partly in diagram, showing an electric motor with its necessary apparatus connected so as to operate in the manner contemplated by my invention; and Fig. 2 is a view showing the connections of the motor and its apparatus wholly in diagram.

In the above drawings, A represents the main framework of a motor having a laminated magnet-frame A', provided with pole-pieces upon which are carried field-coils $a$. The main framework has the ordinary bearings $b$, in which is carried a shaft $b'$, having upon it an armature B, provided with windings and a commutator $b^2$, similar in construction to that employed in any of the well-known forms of direct-current machines. Brushes $b^3$ and $b^4$ are supported on any desired form of brush-holder, as $b^5$, and the machine is operated in connection with a transformer which is also of any of the well-known forms adapted to this type of work.

As is indicated in the figures, one of the supply-mains, as D, is connected to one end of the primary windings C' of the transformer, whose other end is connected to one of the field-magnet windings $a$, the second supply-main being connected to the remaining end of the said field-winding.

One brush or set of brushes, as $b^3$, is connected to one end of the secondary windings C of the transformer, and there is a series of taps connecting various points of the said secondary winding to contact-pieces $c'$. The second brush or sets of brushes $b^4$ of the motor are connected to a movable contact-arm, (represented at $c$,) which is so placed and constructed as to make contact with any one of the contact-pieces $c'$.

In order to reverse the direction of rotation of the motor, a switch $d$ of any convenient design is provided, and this may be placed so as to reverse the armature connections, the connections to the primary winding of the transformer, or to the field connections, in which latter position it is illustrated in Fig. 1 of the drawings.

In operation single-phase current is supplied to the mains D and D', and the armature B is caused to revolve in the well-known manner, the speed of revolution being varied by moving the arm $c$ over the contacts $c'$, and thereby cutting into or out of circuit more or less of the secondary winding C of the transformer.

When desired, the speed of the motor may be varied by varying the electromotive force impressed upon the armature, this being accomplished in any one of a number of ways— as, for example, by changing the magnetic circuit of the transformer.

As shown in Fig. 2, I may, if I desire, arrange the secondary winding of the transformer so that when the movable contact-arm $c$ is moved in one direction from its central position the armature of the motor will turn in one direction, while if such arm be moved to the other side of the central position the direction of rotation of the armature will be reversed.

An important advantage of the method of connection and operation of my improved motor will be seen when it is noted that the windings upon the armature B and the winding of the secondary C are the same or bear constant ratio to each other irrespective of the impressed voltage of the current supplied from the mains D and D'. It is therefore possible to wind the armature for motors of the type above described, as well as the secondaries of the transformers, with wire of the most suitable size from commercial and mechanical standpoints.

In order to change the power factor of the combination, I may connect a condenser $d'$ in parallel either with the field-coil of the motor or with the primary winding of the transformer. If considered advisable, a non-inductive resistance $d^2$ may be substituted for the condenser, Fig. 2 illustrating the condenser as placed around the fields of the motor and the resistance similarly placed in shunt to the primary of the transformer.

It will of course be understood that the primary winding $C^t$ of the transformer and the field-coils of each motor have to be varied to suit the voltage at which the motor is to be operated, this, however, being a comparatively simple matter as long as the armature-winding and the secondary of the transformer may be made the same for all voltages. It is further to be noted that the connections to the armature of the motor are not in any way electrically connected with the external supply-circuit or with the main supply-wires D and D', and it will be understood by those skilled in the art that the possibility of damage to the armature and commutator from grounds is thus prevented. The importance of this feature will be appreciated when it is remembered that accidental grounds to one side of a suppy system are of very frequent, if not continual, occurrence. Occasion might arise, however, where in order to reduce the number of conductors connecting the transformer-windings with the motor it would be advisable to use the wire connecting the primary of the transformer and field; also, for connecting one side of the secondary to one of the armature-brushes. This would reduce the number of wires from the transformer to the motor from four to three, which would be advantageous in certain cases where the point of control is at a considerable distance from the motor.

As a result of the above-described connection of apparatus it is found that the power factor of my improved motor is high and may under conditions be made equal to unity. I have found in operation that the power factor increases with the load up to certain limits and that the armature-current is actually less for high than for a low load, so that even if motion of the armature is entirely arrested the current through it will not cause excessive heating.

The simplicity of the apparatus required, as well as its high efficiency of operation, are very obvious advantages of my improved form of motor, and the ease with which its speed may be varied within wide limits and its direction of rotation reversed are features which frequently are of vital importance.

I claim as my invention—

1. The combination of an electric motor having an armature of the direct-current type, with a transformer, the field-coils of the motor being connected to the supply-mains in series with the primary winding of the transformer and the brushes or sets of brushes of the motor having means whereby they are connected to the secondary winding of said transformer, said means including contact-pieces connected at intervals to said secondary winding and an arm placed to operate upon said contact-pieces, said connections being so made to the secondary winding that the armature will rotate in one direction when said arm contacts with certain of the contact-pieces and will rotate in the opposite direction when the arm contacts with others of said pieces, substantially as described.

2. The combination of an electric motor having an armature of the direct-current type, with a transformer, the secondary winding of the transformer having a series of contact-pieces connected to it at intervals and one of the brushes or sets of brushes of the armature being connected to the said secondary winding at some point of its length between certain of the connections of the contact-pieces, the second armature brush or set of brushes having a device designed to contact with any of the contact-points connected to the secondary winding so as to cause rotation of the armature in one direction when on certain of said contacts and in the opposite direction when engaging certain others of the same, substantially as described.

3. The combination of a motor and a transformer, one armature-terminal of said motor being connected to the secondary winding of the transformer at a point thereon between its ends, a series of contact-pieces, connected to different points of said secondary winding, and a contact-piece connected to the second armature-terminal and placed to engage the contact-pieces on both sides of the point of the connection of the first armature-terminal, substantially as described.

4. The combination of a motor and a transformer, said motor having its field-coils connected in series with the primary winding of the transformer and connected to the supply-mains, the secondary winding of the transformer being in a closed circuit including the armature of the motor, with a reversing-switch connected in the circuit including the armature, whereby the connection to the terminals of said armature may be changed relatively to the terminals of the secondary winding of the transformer, substantially as described.

In testimony whereof I have signed my name to this specification in the presence of two subscribing witnesses.

ADOLPH W. SCHRAMM.

Witnesses:
WILLIAM E. BRADLEY,
JOS. H. KLEIN.